April 5, 1966 B. E. SEAR 3,244,903

LOGIC CIRCUIT

Filed Feb. 21, 1962 6 Sheets-Sheet 1

INVENTOR
BRIAN ELLIOTT SEAR

BY J. Donald Weber, Jr.

AGENT

United States Patent Office 3,244,903

Patented Apr. 5, 1966

3,244,903

LOGIC CIRCUIT

Brian Elliott Sear, Oreland, Pa., assignor to Sperry Rand Corporation, New York, N.Y., a corporation of Delaware Filed Feb. 21, 1962, Ser. No. 174,829
9 Claims. (Cl. 307—88.5)

This invention relates to a logic circuit in particular, the circuit utilizes tunnel diodes as the switching elements thereof and a semi-conductor element exhibiting recombination or charge storage characteristics for providing the required interstage amplification of drive signals.

Since the advent of the tunnel diode, several ways of using its V-I characteristic to perform logical decisions have been suggested. Almost invariably, the tolerance requirements placed on a circuit producing a reasonable fan-in, fan-out are severe and, therefore, make a large system difficult to design. That is, although it is fairly cheap and straight-forward engineering practice to produce a constant current generator or a resistor, or the like, with extremely close tolerances, any attempt to specify the low or high voltage on a tunnel diode to better than ±20% is an expensive objective. That is, in general, the input current supplied to any one of a plurality of cascaded tunnel diode stages is derived from the high voltage operation of the previous tunnel diode stage (in a tunnel diode logic circuit system) and, since this operation is difficult to specifically control, it presents a severe tolerance problem. In other words, inasmuch as the succeeding stage requires that the drive current thereto be quite substantial with relation to the output current available from the preceding stage, a driving circuit must be limited in the number of circuits to be driven thereby because of the tolerances of the input signals to the driven circuits. In the circuits proposed herein, this limitation has been overcome. That is, all bias and output currents to and from a tunnel diode circuit are obtained from constant current supplies and input current is obtained from a separate source. This operation utilizes all the available current gain of the circuit as efficiently as possible.

In particular, an "amplification stage" is inserted between the output of the "preceding stage" and the switching tunnel diode of the "succeeding stage." The amplification stage incorporates a semi-conductor element and in particular a diode which utilizes stored charge or recombination characteristics as a coupling circuit between tunnel diode stages. This coupling circuit provides a fast acting, easily controlled, power amplifier in the network between the output of the preceding stage and the tunnel diode of the succeeding stage. The power amplification provided by the coupling circuit supplies current to the tunnel diode of the succeeding stage to thereby switch said tunnel diode. It will be seen that the drive current is supplied by an external source which provides a large magnitude signal whereby the tolerances of the tunnel diode to be switched are recognized and overcome without a serious drain on the input circuit.

Thus, it will be seen that one object of this invention is to provide a logic circuit using tunnel diodes.

Another object of this invention is to provide a logic

NOR circuit utilizing tunnel diodes as the switching elements thereof.

Another object of this invention is to provide a novel interstage coupling network between the tunnel diode stages in a high speed switching network.

Another object of this invention is to provide a novel interstage coupling network which exhibits considerable gain.

Another object of this invention is to provide a tunnel diode switching network wherein an improved fan-out characteristic is accomplished.

Another object of this invention is to provide a tunnel diode logic circuit having improved fan-out and circuit tolerance characteristics.

Another object of this invention is to provide a tunnel diode logic circuit wherein the tolerances on the tunnel diode characteristics and on the associated circuitry are relatively immaterial to the operation of the circuit.

Another object of this invention is to provide a logic circuit having the amplification usually provided by transistors but with the speed inherent in tunnel diodes.

Another object of this invention is to provide a tunnel diode logic circuit having a level output between the clock pulses of a particular phase in order to provide a maximum flexibility of system logic.

Another object of this invention is to provide a tunnel diode logic circuit having no minimum delay requirement but having a large tolerance for jitter of the clock.

These and other objects and advantages of this invention will become more readily apparent subsequent to a reading of the following description in conjunction with the attached drawing in which.

Figure 1:
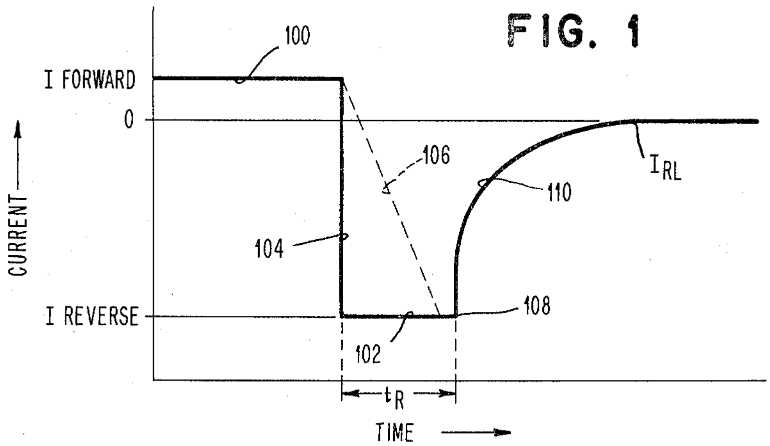
FIGURE 1 is a graphical representation of the recombination characteristic of a typical rectifier diode exhibiting recombination properties.

Referring now to FIGURE 1, there is shown a typical characteristic of a semi-conductor diode utilizing recombination as described in the November 1954 issue of Radio Electronics at pages 94 and 95. This characteristic is shown as a function of current versus time. The heavy continuous line is representative of the idealized characteristic. The dashed line is representative of a more typical characteristic actually obtainable. It is to be understood of course, that certain noise and ringing effects may also occur but are eliminated from the drawing for simplicity. In particular, the line 100 is representative of the current which is passed by the diode when the diode is biased in the forward direction, i.e. with a potential applied to the diode such that the anode thereof is positive relative to its cathode. When the potential applied to the diode is switched such that the anode thereof is negative relative to its cathode, the current through the diode immediately switches, in the ideal case, from the forward current $I_F$, to the reverse current $I_R$, designated by line portion 102. This reverse current is provided by the fact that there is a recombination of the stored charge in the semi-conductor material of the diode. That is, the reverse current is created by the recombination of the electrons and holes in the material of the diode either as they drift to the recombined condition, or, in the alternative, if the diode is properly reverse biased, the sub-atomic charged particles may be actually swept through the diode structure to the proper position. Regardless of the manner in which the recombination takes place, a reverse current is exhibited by the diode; and power gain can be utilized in a circuit utilizing this phenomenon. The larger the reverse current, the shorter the recombination time $t_R$.

The vertical line portion 104 suggests that the switching of the diode can be done instantaneously. This suggestion is, of course, only for the idealized case. Practically, the transition characteristic between the forward and reverse currents is more closely akin to the line portion 106 (shown dashed). Nevertheless, whenever a recombination diode has been rendered conducting in the forward direction, a certain reverse current is exhibited by the diode when the potentials at the electrodes thereof are instantaneously reversed. When the minority charge carriers have been substantially completely recombined (as for example at the point 108), a small current continues to flow through the diode for a short period of time. This current, represented by the arcuate line portion 110, is termed the reverse leakage current $I_{RL}$. The magnitude of this current is indicated by an exponential curve (line portion 10) and approaches a very small current. The magnitude of this current is limited by the impedance of the reverse biased diode.

Figure 2:
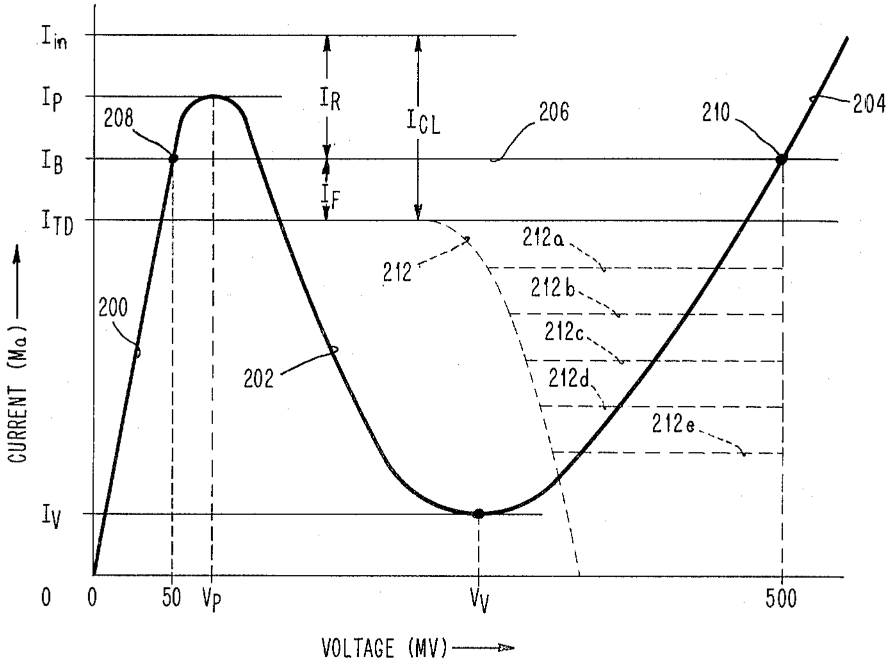
FIGURE 2 is a graphical representation of a V-I characteristic of a typical tunnel diode.

Referring now to FIGURE 2, there is shown graphically a typical tunnel diode V-I characteristic. The low voltage or peak voltage state is represented by line portion 200 (between zero and $V_P$). The unstable or negative resistance region is represented by line portion 202 (between $V_P$ and $V_V$). The high voltage or forward voltage state of the tunnel diode is represented by line portion 204 (to the right of $V_V$). The load lines 206 and 250 are representative of steady state load lines which intersect the V-I characteristic of the tunnel diode for different steady state operations. The achievement of the particular steady state operating condition will be more fully explained with relation to FIGURES 3 and 4. The load line 206 intersects the tunnel diode characteristic at point 208 in the low voltage state and at point 210 in the high voltage state of the tunnel diode operation. Load line 250 determines similar operating points. The dashed lines 212 through **212*e* are operational (as opposed to steady state) load lines. That is, for a single output load, the load line 212*a* obtains. For two output loads, the load line 212*b* obtains. Similarly, three, four and five output loads are represented by load lines 212, 212*d* and 212*e*, respectively. It is to be understood of course, that the dashed line 212 need not actually be a single continuous line as suggested. Rather, each of the subsequent load lines (e.g. 212*b*, 212*c*, etc.) may have somewhat dissimilar characteristics than the previous line whereby the portion of the characteristic represented generally by 212 may be removed somewhat to the right such that the characteristic is not smooth as shown in FIGURE 2 but is, in fact, a discontinuous or stepped line. For purposes of clarity and simplicity only, load line 212** is shown as a smooth continuous dashed line.

Load line 212 is also shown as extending from the load line 206 to the base line of the tunnel diode characteristic. This phenomena is indicative of the fact that, if a sufficient number of output lines are connected to the tunnel diode, the driving of these loads will cause the tunnel diode to switch from the high or forward voltage state to the low or peak voltage state when the outputs are produced. This so-called asynchronous mode of operation is contemplated within the principles of the circuit as described though not necessarily preferred. As shown in FIGURES 1 and/or 2, the idealized characteristics are illustrative only and not to be limitative of the operation of the circuit. Thus, any values listed thereon are illustrative values to suggest the operation of the circuit only and are not meant to be restrictive values to limit the scope of the invention.

Figure 3:
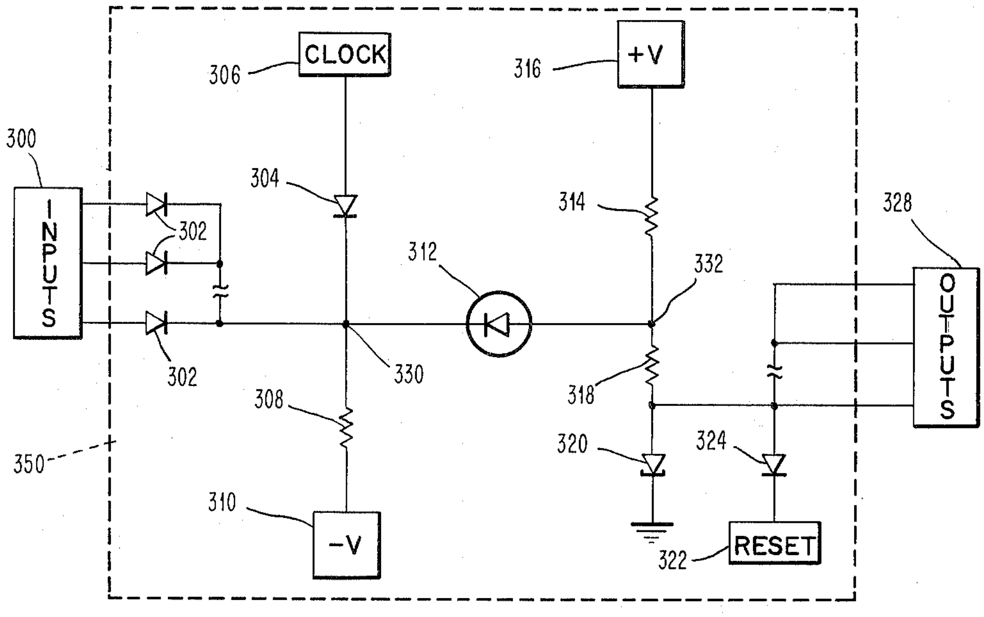
FIGURE 3 is a schematic drawing of one embodiment of the invention.

Referring now to FIGURE 3, there is shown a schematic drawing of one embodiment of this invention. A single complete circuit or stage is enclosed within dashed line 350. An input device 300 is connected to the circuit via input means as for example, coupling resistors or the like. In the preferred embodiment, diodes 302 are shown inasmuch as resistor coupled inputs may have some practical limitations. For simplicity, the input device 300 is shown as a single element. However, it is to be understood that the device 300 may be representative of a single input device or a plurality of separate and individual input circuits each of which is linked to a different input diode 302. Similarly, there are shown three input diodes 302 for connecting the input device to the circuit. The number of input diodes is not necessarily fixed at three but may be varied to include the number of diodes which is desired. The diodes 302, which may be Qutronics ID5–050 diodes for example, are poled such that a positive input signal with respect to ground may be passed from the input device therethrough to the remainder of the circuit. For example, the diodes have the anodes thereof connected to the input device and the cathodes thereof connected to a common junction 330. Also connected to junction 330, is the cathode of diode 304. The anode of diode 304 is connected to clock source 306. The clock source, in this embodiment is a voltage source adapted to provide a periodic, positive going current signal having a minimum peak value of about 0.3 $I_P$ where $I_P$ is the peak current for the tunnel diode (see FIGURE 2). Typically, the base line value of the clock signal is substantially ground potential. The current signal is defined by the applied voltage, the impedance of the network, the charge stored in the diode and the duration of the clock signal. The current signal produced by the clock is graphically represented as $I_{CL}$ (see FIGURE 2). This signal defines the input current $I_{IN}$ in terms of the steady-state current $I_{TD}$. In addition the clock should be of relatively high frequency. A typical such clock source is described in the copending application entitled High Frequency Pulse Generator, of T. K. Lewis, S.N. 152,338 filed November 14, 1961, and assigned to the same assignee as this application. A simple clock is a half-wave rectified sine wave. This current signal is applied to common junction 330 via diode 304 which may be a Clevite 1N270 diode for example. Resistor 308 (5000 ohms) has one terminal thereof connected to common junction 330 and another terminal thereof connected to voltage source 310. Voltage source 310 is a substantially constant voltage source supplying about −10 volts. A recombination rectifier diode 312 which may also be a Clevite 1N270, has the anode thereof connected to common junction 332 and its cathode connected to junction 330. This recombination diode 312 is the diode which provides the interstage amplification, as will become apparent with the description of the operation of the circuit. Resistor 314 (1000 ohms for example) has one terminal thereof connected to common junction 332 and another terminal thereof connected to a potential source 316. Potential source 316 provides a substantially constant potential of approximately +15 volts. Another resistor 318, of about 5 ohms, has one terminal thereof connected to common junction 332. Another terminal of resistor 318 is connected to the anode of tunnel diode 320 which has the cathode thereof returned to ground or other suitable reference potential. A typical tunnel diode is the RCA 1N3129 type. The tunnel diode is preferably biased to about 0.7 $I_P$ by the potential source 316 and the resistor network connected thereto. Connected to the anode of tunnel diode 320 is the anode of diode 324. The cathode of diode 324 is connected to reset clock 322. The reset clock 322 is, in this embodiment, adapted to provide a negative going signal with respect to ground thereby producing a current signal of about 0.7 $I_P$. This current signal when applied to tunnel diode 320 via diode 324 is sufficient to reset the tunnel diode 320 from the forward voltage condition to the peak voltage condition. Also connected to the anode of tunnel diode 320 and diode 324 is output device 328. As in the case of input device 300, the output device 328 is shown as a single element for purposes of clarity only. That is, the output device 328 may be representative of a single device utilizing all of the output signals or, on the contrary, the output device 328 may be representative of a plurality of independent output circuits. The number of output loads to be driven by tunnel diode 320 is not to be limited to the three outputs shown in the drawing but rather, is limited by the practical outputs available from the circuit.

Figure 4:
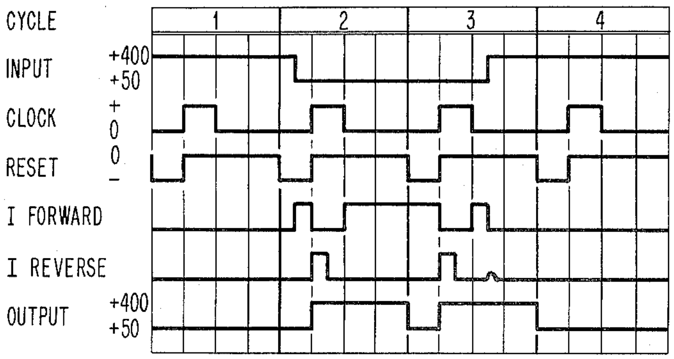
FIGURE 4 is a timing diagram for the embodiment shown in FIGURE 3.

In order to more clearly describe the operation of the circuit shown in FIGURE 3, reference is concurrently made to the timing diagram shown in FIGURE 4. In the timing diagram of FIGURE 4, the reset clock pulse and the clock pulse are shown as regularly recurring signals. It may be clear that the operation of the circuit is not limited to the utilization of such clock and reset clock signals. On the contrary, a mode of operation may be proposed wherein the clock and reset clock pulses may be generated in accordance with a clock signal associated with related circuitry whereby the clock and reset clock signals are applied only at infrequent intervals. The criterion required is, however, that the reset clock pulse signal must precede the clock signal in order that the tunnel diode 320 will be reset to the low voltage or peak voltage condition.

In order to illustrate in general fashion, the operation of the circuit, the timing diagram of FIGURE 4 is described in terms of operating cycles. These cycles are shown and described, for convenience only, as portions of continuous waveforms. It is to be understood that the idealized waveforms shown in FIGURE 4 may be spaced closer together or further apart without altering the operation of the circuit. In the preferred form however, the ratio of the duration of the output signal to the time duration of the reset and clock signals is to be as large as possible. Thus, during cycle 1 the negative going reset clock pulse is applied to tunnel diode 320 whereby the diode is switched to the peak voltage condition 200 (see FIGURE 2). At the same time, the input signal supplied by input device 300 to at least one of the input diodes 302 is assumed to be in the high level state. This high level is represented by an inqut potential of approximately +400 millivolts. A +400 millivolt magnitude is suggested in view of the fact that a plurality of circuits similar to the instant circuit may be utilized whereby the input signal supplied by element 300 may be the output signal from a preceding tunnel diode circuit. The +400 millivolt signal forward miases diode 302 and applies a potential of substantially +400 millivolts at the cathode of recombination diode 312. Inasmuch as the potential supplied to the anode of recombination diode 312 is less than +400 millivolts (on the order of +100 millivolts) the diode 312 is reverse biased. The potential at the anode of diode 312 may be about +100 millivolts inasmuch as the potential at the anode of tunnel diode 320 is approximately +50 millivolts in its low voltage state and the source 316 provides approximately 0.7 $I_P$ via resistor 314 such that tunnel diode 320 is biased to $I_B$ in FIGURE 2. In view of the fact that recombination diode 312 is reverse-biased under these conditions, no charge is stored therein. Consequently, when the clock signal is supplied by source 306 during cycle 1, the diode 312 presents a large impedance whereby the signal from source 306 flows through source 310 via diode 304 and resistor 308. The tunnel diode 312 therefore remains in the low level or peak voltage state. The potential at the output 328, therefore, remains at approximately +50 millivolts. Thus, there is no change in the output whereby no high level output signal is provided and the output signal remains at the low level.

Again, during cycle 2 a reset clock pulse is applied to the anode of tunnel diode 320 to assure that the tunnel diode 320 is initially in the peak voltage state. (In this illustrative case, the tunnel diode 320 was not switched back to the peak voltage inasmuch as it had not been switched to the forward voltage stage since the operation in cycles 1 and 2 is treated as continuous.) It will be seen that now during cycle 2, the input signal applied by input device 300 is assumed to switch from the high level signal to the low level signal. That is, the input level drops from approximately +400 millivolts to approximately +50 millivolts. This change in the input signal renders the input diodes 302 non-conductive. That is (in view of the effective ground potential supplied to the cathodes of diodes 302 by source 306 and sink 310) the application of a low voltage signal (+50 millivolts) to the anode of an input diode is insufficient to drive the diode past the break-point thereof (which may be on the order of 250 millivolts) and the diode appears as a very high impedance. Thus, the potential at common point 330 is substantially lower than before and on the order of −200 millivolts (due to voltage drop across diode 304). Therefore, the recombination diode 312 is now forward biased. That is, the forward current which had previously flowed from source 316 via resistor 314 and resistor 318 through the tunnel diode 320 to ground, is now diverted such that at least a portion of the current (designated as $I_F$ in FIGURE 2) passes through diode 312 and resistor 308 to source 310 and the steady state current level in the tunnel diode switches from $I_B$ to $I_{TD}$. The forward current flow through diode 312 is effective to store charge in the lattice structure of the diode. (This forward current is represented by a short pulse during cycle 2 because the clock pulse during this cycle reverse biases the diode 312.) Thus, when the clock pulse is supplied by source 306 during cycle 2 (subsequent to $I_F$ flow), a portion of the current can now flow from the source 306, through diode 304, through reverse biased diode 312 in accordance with the normal recombination current, through resistor 318, and through tunnel diode 320 to ground. This reverse current ($I_R$ in FIGURE 2) has the effect of switching the tunnel diode 320 to the high voltage or forward voltage state. When the tunnel diode 320 is switched to the high voltage or forward voltage state, an output is produced. That is, when the tunnel diode 320 is switched to the high voltage state the anode thereof exhibits a potential of approximately +400 millivolts. This potential of approximately +400 millivolts is supplied to the output 328. The output signal continues at the high level until tunnel diode 320 is reset to the low voltage state by the application of a signal by reset clock 322. In this regard the reset clock pulses are negative going signal pulses relative to ground potential and diode 324 (for example, a silicon diode) has a threshold of such value (on the order of .75 volt) that it will be substantially nonconducting at all times except during the negative portions of the reset clock signal. In other words the conducting threshold of diode 324 is greater than the high voltage potential developed across tunnel diode 320. Thus, in the mode of operation discussed supra, wherein multiple-phase clocking or less frequent clocking is used, the advantage is gained that with a relatively short reverse current, a long or continuous output level signal may be provided. The tunnel diode thus provides a storage function as well as a switching function. This is shown in FIGURE 4 inasmuch as the reverse current signal, $I_R$, is shown as a much shorter signal than the output signal. Moreover, with this timing arrangement a more efficient utilization of the recombination current may be effected and greater fan-out obtained. That is, the diode 312 can be "charged" to full capacity prior to the "discharge" thereof. It should be understood that the waveforms shown in FIGURE 4 are illustrative only and are not meant to be limitative or restrictive of the circuit.

Continuing to cycle 3, the reset clock signal is again supplied by source 322 to tunnel diode 320 via diode 324. By treating cycle 2 and cycle 3 operation as continuous, tunnel diode 320 is reset to the low or peak voltage state. In this state of operation, the anode thereof has a potential of approximately +50 millivolts thereon. This +50 millivolt potential is provided at the output device 328 and may be considered as "no output" signal (or as "no input" to the succeeding circuitry). In the illustrative example shown in FIGURE 4, the input signal remains in the low state during the reset signal supplied to tunnel diode 320 by source 322. This low level input signal permits recombination diode 312 to be forward biased during a portion of cycle 3 and pass forward current therethrough from source 316 to source 310. The forward current flow through the diode 312 again establishes charge storage in the diode 312 whereby the recombination effects may be utilized in producing a reverse current. Thus, when the clock 306 provides the signal during cycle 3, reverse current flows through recombination diode 312 and sets tunnel diode 320 to the high voltage or forward voltage condition. Again, the +400 millivolt potential at the anode of tunnel diode 320, while operating in the high voltage state, produces output signals at output device 328.

The input signal supplied by source 300 is changed during cycle 3 such that the input signal is a high level signal and forward biases input diodes 302. When at least one of the input diodes 302 is forward biased, the potential at common junction 330 increases to substantially +100 millivolts. As in the case of the initial time period (cycle 1) the recombination diode 312 is back biased. The application of this reverse bias to the diode 312, besides back biasing the diode may also cause a certain amount of reverse current to flow in the diode inasmuch as the stored charge is being recombined therein. This reverse current (which is described for completeness only) is negligible and is so insignificant that it is not sufficient to switch the tunnel diode 320 from the low voltage state to the high voltage state. Inasmuch as the diode 312 was effectively back biased and spurious storage charge therein was cleaned-up by the changing of the input signal, the clock pulse supplied during cycle 4 will not create a switching current through diode 312. Thus, tunnel diode 320 will not be switched but will reside in the low voltage condition. The input signal during cycle 4 remains in the high level state whereby the diode 312 is effectively back biased and cannot store charge therein. Thus, the clock pulse supplied by source 306 is ineffective to provide any reverse current through diode 312. The lack of current flow through diode 312 in the reverse direction prevents the switching of tunnel diode 320 to the high forward voltage state whereby high level output signals are not generated at output device 328.

As stated supra, the timing chart shown in FIGURE 4 is not meant to be limitative or restrictive of the circuit operation. Moreover, the waveforms as shown are, in some respects, an idealized form. The cycles need not operate conjunctively as shown in the example. That is, in preferred embodiments, for example cascaded circuit configurations, the timing of the application of the input signals may be set to coincide with the application of the reset signal whereby the full charge storage may be accomplished in diode 312 so that a reverse current therethrough may be maximized by the clock pulse supplied by source 306. Moreover, the application of input signals (or the timing thereof) with the application of the reset clock signals will also avoid the possibility of any spurious reverse current signals as shown during cycle 3. This timing arrangement is often referred to as multiphase operation (see FIGURE 8). Also the input signals could be, if desired, of a single clock pulse duration which clock pulse duration may be much shorter than graphically shown.

It is to be further understood, that for the sake of clarity and simplicity, the signals applied to and supplied by the circuit are shown as rectangular pulses or levels. It is clear that these signals may actually be substantially sinusoidal type signals, spike type pulses, or some other varying signal which could be represented by a complex Fourier series. However, the operation of the circuit is the same regardless of the signal shape supplied thereto.

In addition, the circuit of FIGURE 3 may be thought of as an inverting AND gate or NOR circuit since the application of coincident low level input signals at the input diode cluster 302 is required in order to produce a high level output from the tunnel diode 320. In the alternative, the application of any single high level input signal to the input diodes 302 will produce a low level output signal from tunnel diode 320.

Figure 5:
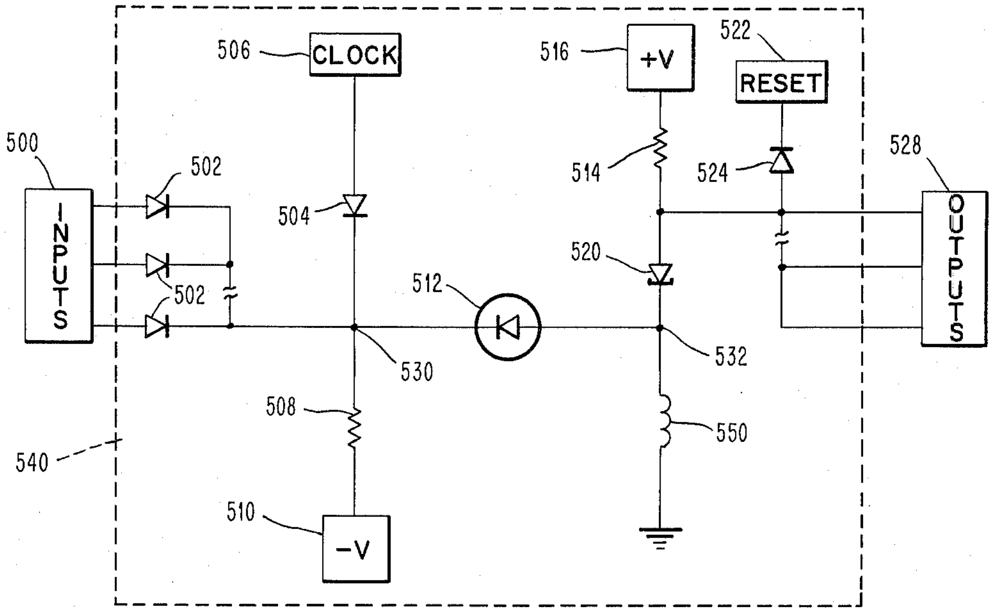
FIGURE 5 is a schematic drawing of another embodiment of the invention.

Referring now to FIGURE 5, there is shown a further embodiment of this invention with a single complete circuit or stage enclosed by dashed line 540. It will be seen, that in the enumeration of the components of this circuit, components which are similar to components in FIGURE 3 have the last two digits thereof similar. Thus, the input device 500 may be a single input or it may be a plurality of independent input circuits. Again, input device 500 is connected to the anodes of a plurality of input diodes 502. The cathodes of the input diodes are connected to a common junction 530. Connected to the common junction 530 is the cathode of diode 504 which has the anode thereof connected to clock pulse source 506. Clock pulse source 506 is of any conventional type and may be similar to clock pulse source 306 in FIGURE 3. Resistor 508 has one terminal thereof connected to common junction 530 and another terminal thereof connected to the negative voltage source 510. Voltage source 510 is similar to voltage source 310 of FIGURE 3. Recombination diode 512 has the cathode thereof connected to common junction 530 and the anode thereof connected to the junction 532. Unlike the common junction 332, the common junction 532 has connected thereto the cathode of tunnel diode 520. The anode of the tunnel diode 520 is connected to positive voltage source 516 via resistor 514. Source 516 is similar to source 316 in FIGURE 3. The reset clock pulse source 522 is connected via diode 524 to the anode of tunnel diode 520. Also connected to the anode of tunnel diode 520 is the output device 528 which is similar to output device 328 in FIGURE 3. That is, output device 528 may comprise a single output unit or a plurality of independent output utilizing circuits. The primary distinction between the circuits shown in FIGURES 3 and 5 is that the common junction 532 is connected to one end of an inductance 550, which has the other end thereof connected to ground. The inductor 550, which may be for example 1.0 nanohenry, serves the function of delaying the effect of the reverse current flow through diode 512 upon the subsequent switching of tunnel diode 520.

Figure 6:
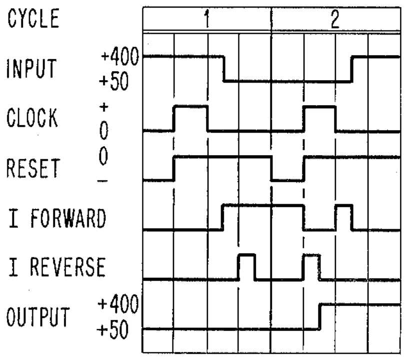
FIGURE 6 is a timing diagram for the embodiment shown in FIGURE 5.

The operation of the circuit shown in FIGURE 5 is more clearly understood by referring to the timing diagram associated therewith shown in FIGURE 6. Again, FIGURE 6 is shown and described in terms of operating cycles which may be, but do not necessarily have to be, continuous operating cycles. Thus, the application of a reset clock signal during cycle 1 places the tunnel diode 520 in the low voltage or peak voltage operational state. Consequently, a potential of about +50 millivolts is applied to the anode of diode 512. In view of the high level input signal applied by input device 500 to input diodes 502, diode 512 is reverse biased. Therefore, no forward current flows through diode 512 and charge is not stored therein. With the application of clock signals by clock pulse source 506 during cycle 1, the diode 512 remains reverse biased and reverse current does not flow therethrough inasmuch as there is no stored charge because of the previous lack of forward current therethrough. Therefore, tunnel diode 520 remains in the low voltage state and no high level output signal is produced. Subsequently, during cycle 1, the input signal supplied by source 500 changes to the low voltage level. The voltage drop across diodes 502 is such that the diode 512 may be rendered conductive. Therefore, forward current flows from source 516, through resistor 514, tunnel diode 520, diode 512, and resistor 508 to source 510. This forward current flow creates the storage of charge in the lattice structure of the diode, but is not sufficient to switch the tunnel diode to the high voltage operating condition. That is, the tunnel diode 520 is initially biased to $I_{TD}$ of FIGURE 2. However, when the diode 512 is conducting forward current ($I_F$) the tunnel diode shifts to the $I_B$ load line. (This load line shift is opposite to the shift exhibited by the circuit of FIGURE 3.) Consequently, during cycle 2, when the clock signal is supplied by source 506 via diode 504, reverse current will flow through diode 512 and inductor 550 to ground. The reverse current through diode 512 is added algebraically to the current normally flowing through inductor 550 (from source 516) whereby a larger current flows through inductor 550. When the clock signal supplied by source 506 is terminated or when the charge recombination is completed (whichever occurs first), the reverse current through diode 512 subsides. However, this current while flowing through inductor 550 created a large magnetic field therearound. When the current supplying the field is removed, the field in and around the inductor 550 tends to collapse in such a manner as to effetcively attempt to restore or maintain the current flow therethrough. In attempting to maintain this current flow, additional current is drawn from source 516 via resistor 514, and tunnel diode 520. The further current drawn through tunnel diode 520 is effective to drive the tunnel diode from the low voltage state to the high voltage state as shown in FIGURE 6. When the tunnel diode is switched to the high voltage state, the anode thereof exhibits a potential of approximately +400 millivolts. This +400 millivolt signal produces an output signal at the output device 528.

It will be seen from FIGURE 6 that the output signal is delayed with respect to the $I_R$ signal. This is understandable when it is noted that the $I_R$ signal is algebraically added to the current normally flowing through inductor 550. Thus, the current flow through tunnel diode 520 may actually be diminished during the $I_R$ signal. However, when this $I_R$ signal ceases, then and only then does the magnetic field collapse in and around inductor 550. At this time, the current required by the inductor can be supplied only via the tunnel diode 520 since diode 512 is cutoff. Therefore, it should be seen that the output signal is produced only subsequent to the cessation of the $I_R$ signal.

It is clear, therefore, that these circuits provide a logical NOR type of operation. That is, with the application of a high level input signal to at least one of the input devices, there is supplied to the output devices a low level output. On the contrary, however, with the application of low level input signal to all of the input devices, a high level output signal is supplied to the output device. Furthermore, the circuit provides the distinct advantage in that the fan-out network may have increased numbers of output derived therefrom. That this is possible is seen insofar as the tunnel diode in each stage is actually driven by the current supplied by the clock pulse source. That is, inasmuch as each tunnel diode requires about 0.25 or 0.30 $I_P$ (where $I_P$ represents the peak current) to drive the tunnel diode from the low voltage state to the high voltage state, a preceding tunnel diode is generally limited to a maximum of three outputs. However, as described in these circuits the tunnel diode is driven by the individual clock pulse source associated therewith and substantially less current is required to be delivered to each output by a tunnel diode. Consequently, the fan-out network limitations as well as circuit tolerance requirements are considerably reduced. As discussed supra, the illustrative embodiments shown herein are not meant to be limitative nor restrictive of the scope and principles of the operation and the component values suggested are exemplary only. In addition, certain minor variations in the exact configuration of the circuit may suggest themselves to those skilled in the art without actually departing from the principles of this invention. For example, the resistor 318 as shown in FIGURE 3 may be removed from the circuit if the operating characteristics of the diodes utilized are more precisely determined. Other minor variations may suggest themselves in accordance with the exact advantage of the circuit which is to be maximized.

Figure 7:
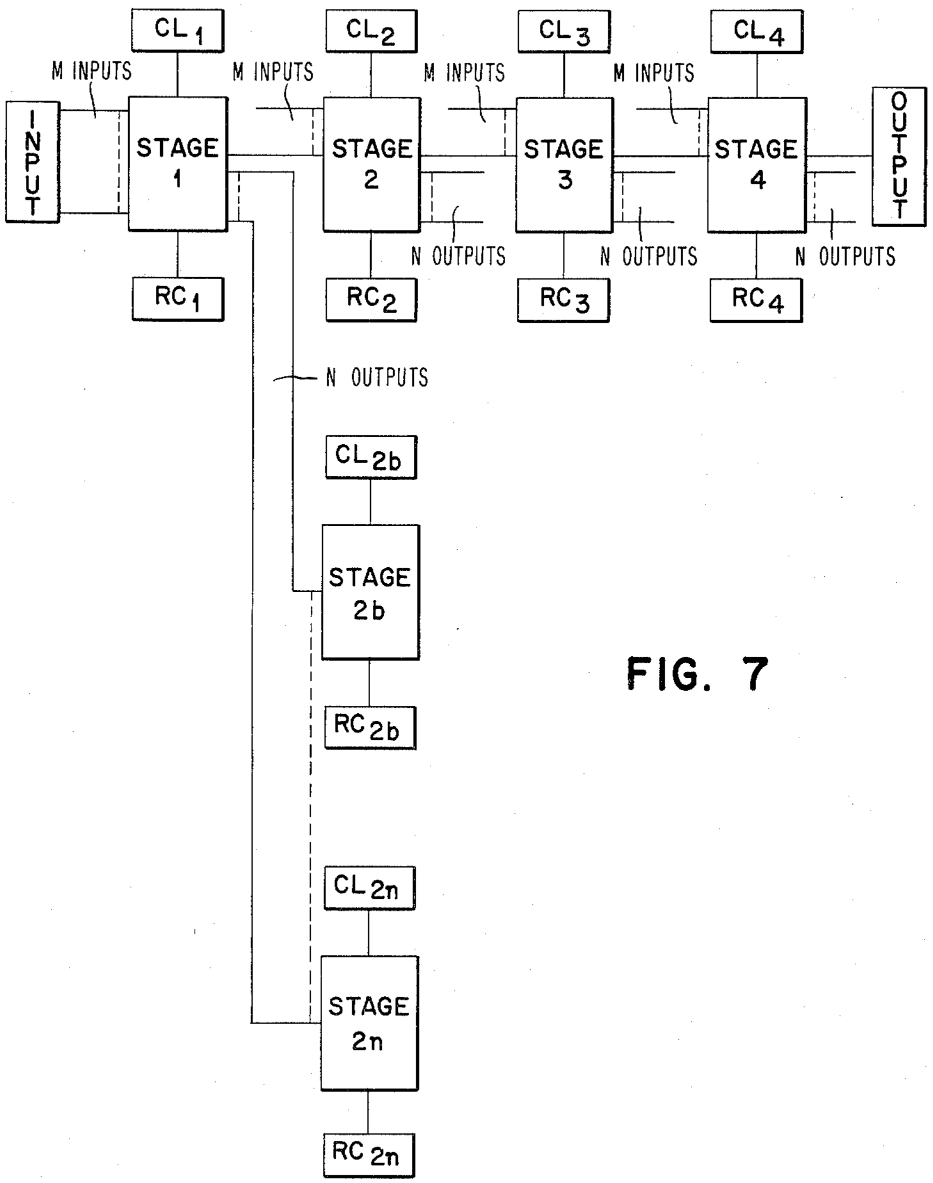
FIGURE 7 is a block diagram of a plurality of cascaded circuits as shown and/or described supra.

Referring now to FIGURE 7, there is shown a block diagram of a system comprising a plurality of cascaded stages where each stage is similar to the circuits shown in either of FIGURES 3 or 5. Each of these stages has the associated clock and reset clock sources shown separately for convenience. The clock source is labeled $CL_{(n)}$ and the reset clock source is labeled $RC_{(n)}$ where *n* represents the stage designation. Each of the stages is shown as having M inputs and N outputs. It should be understood, of course, that the quantities M and N can vary for each of the stages shown in FIGURE 7 or can be equal.

As noted, stages 1, 2, 3, and 4 (as well as stages 2*b* through 2*n*) are similar in circuit configuration to one of the embodiments shown in FIGURES 3 or 5. Thus, the input device 700, which is similar to input device 300 or 500, is connected to the input of stage 1. The clock source CL1 and reset clock source RC1 associated with stage 1 are connected thereto. As previously described, stage 1 is capable of supplying N outputs. Again, in this example, the N outputs are represented by three outputs but are not limited thereto. Outputs from stage 1 are connected, for example, to the inputs of stage 2 as well as stages 2*b* through 2*n*. Again, one of the N outputs produced by stage 2 is supplied as one of the M inputs of stage 3. The remainder of the outputs are not shown connected to further stages for convenience. Stage 3 also provides N outputs, one of which is utilized in the M inputs which are supplied to stage 4. Again, the N outputs provided by stage 4 are shown connected to output device 728 which may be similar to output devices 328 and 528 of FIGURES 3 and 5, respectively. That is, output device may be some external circuitry or may, in fact, be representative of a further stage of the cascaded circuit arrangement. The creation of a recirculating type network by the superposition of the output device on the input device is not meant to be excluded.

Figure 8:
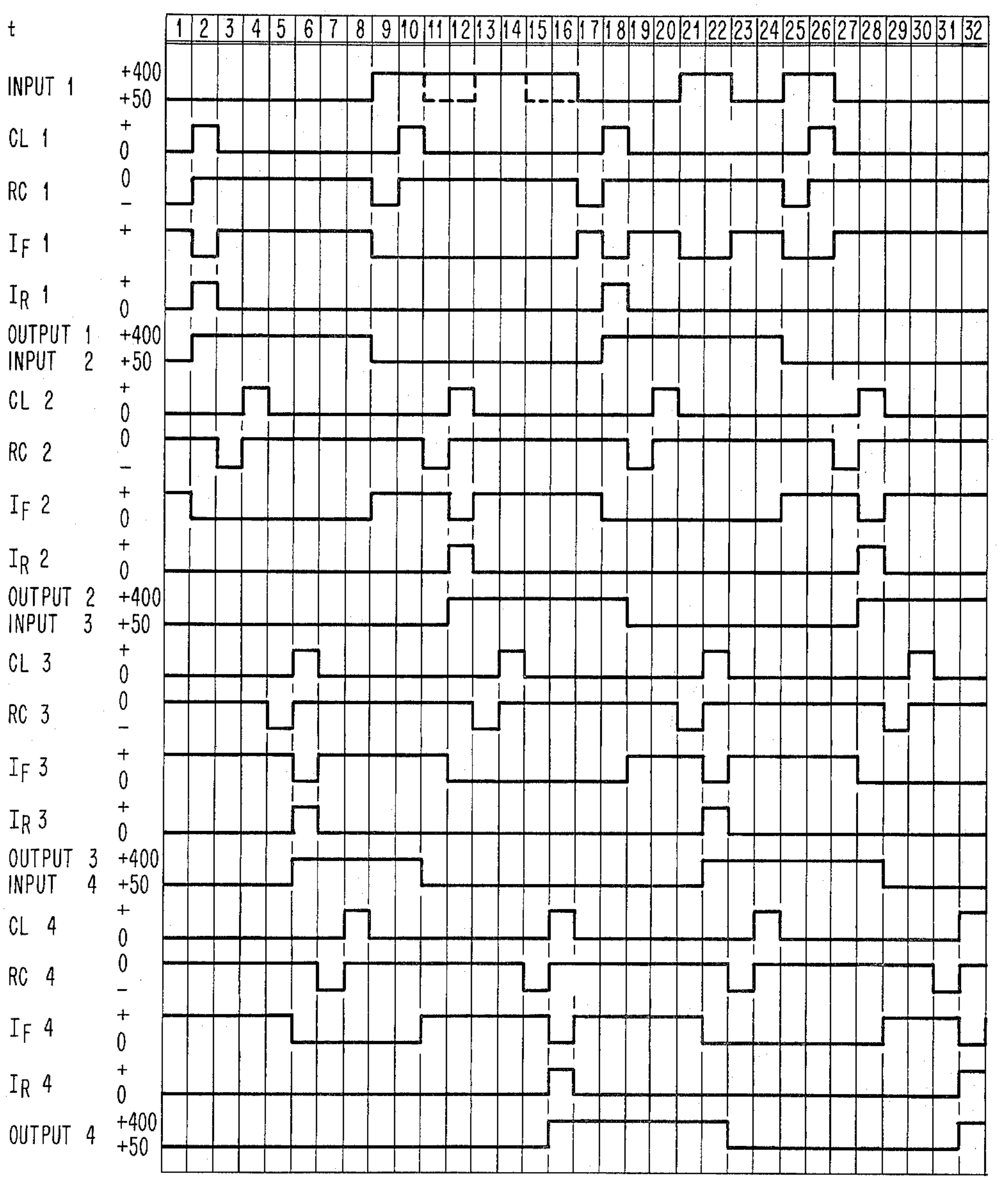
FIGURE 8 is a timing diagram for the cascaded circuit arrangement shown in FIGURE 7.

The operation of the cascaded circuit system shown in FIGURE 7 is more readily apparent when described in conjunction with the timing diagram shown in FIGURE 8. This timing diagram is not to be construed as limitative but is exemplary only. In FIGURE 8, the arbitrary input signal supplied by input source 700 to stage 1 is shown as Input 1. This input signal may have been supplied by a preceding circuit similar to those described supra. Consequently, the input signal is described as a voltage level or pulse signal which varies between +50 and +400 millivolts. The input signal is shown as being a low level or +50 millivolt signal from time period *t1* through time period *t8*. At time period *t9*, the the input signal switches to the high or +400 millivolt level signal and remains until time period *t16*. At time period *t17*, the input signal again becomes a low level signal and remains such until time period *t20*. At time periods *t21* and *t25*, the input signal switches to the high level signals and at time periods *t23* and *t27* the input signal switches back to the low level. As shown in FIGURE 8, the input signal remains a low level signal until time period *t32* which is the last time period shown. It is to be understod that there is no significance or pattern represented by the input signals as supplied but, on the contrary a random signal selection is suggested for purposes of example.

The clock and reset clock signals are shown as four-phase signals. It should be clear, of course, that four-phase signals are not absolutely necessary to the operation of the circuit. Rather, by proper phasing of clock and reset clock signals, three-phase or some other multiphase arrangement may be utilized. However, for purposes of explanation and clarity the four-phase clock-reset clock signals have been shown as being applied to each of the stages in the circuit.

The forward current which is selectively produced is shown on the $I_{Fn}$ lines where $I_F$ represents forward current and *n* designates the specific stage. It will be seen (especially in view of the discussion supra) that in any stage forward current flows in the recombination diode only when the input signal is a low level signal. That is, referring to FIGURE 3 for example, the recombination diode 312 is forward-biased (thereby permitting forward current flow) when the input signal is a low level signal. Moreover, the forward current will not flow when a clock pulse is applied to the circuit inasmuch as the clock pulse back-biases the recombination diode as effectively as a high level input signal. Conversely thereto, reverse current can only flow during the application of a clock signal to the circuit. However, the application of the clock signal, in order to provide reverse current ($I_{Rn}$) must be applied subsequent to the previous application of forward current to the recombination diode. In the event that forward current is not supplied to the diode in the time period immediately preceding the clock pulse, it is assumed that the recombination of the stored charge in the recombination diode has been effected and reverse current will not be passed by the diode during the application of the clock signal.

The $\text{Output}_{(n)}/\text{Input}_{(n+1)}$ signals (viz. the output signal from one of the stages in the circuit which is supplied to a succeeding stage in the circuit) is a low level signal at all times with the exception of times immediately succeeding the production of a reverse current signal or pulse. That is, the reverse current through the recombination diode will set or switch the tunnel diode to the high voltage state. This high voltage operating condition of the tunnel diode provides a +400 millivolt signal at the anode thereof which is supplied to the output of the circuit. Moreover, as is discussed supra, the tunnel diode is reset to the low level operating condition with the application of the reset clock signal. Consequently, the maximum length of a high level output signal will be that time period between a clock pulse and the succeeding reset signal. It is to be understood of course, that by incorporating conventional wave-shaping circuits between the various stages, the output signal of one stage may be fed to the input of the succeeding stage in the form of a level as opposed to a pulsating type signal. However, as indicated in the Input 1 pulse line, the critical portion of the input signal is that portion which coincides with adjacent reset clock and clock signals of stage. Thus, the input level signal portion which is shown by the dashed-line in Input 1 pulse-line may be eliminated without altering the operation of the circuit inasmuch as this portion of the signal is immaterial.

More particularly, referring to time periods *t1* through *t8*, it will be seen, as mentioned supra, that the input signal is a low level signal. This low level signal (about +50 millivolts) therefore, permits, at the proper times, the production of forward current ($I_{F1}$) through the recombination diode. Moreover, with the application of the clock pulse (CL1) at time period *t2* reverse current ($I_{R1}$) flows through the diodes because of the previous forward current. This reverse current produces an output signal at Output 1. The output signal is, of course, furnished as an input to stage 2. Since the input to stage 2 is high during time periods *t2* through *t8* forward current ($I_{F2}$) does not flow in stage 2 between these times. More particularly, this forward current does not flow in the time period *t3* immediately preceding the signal supplied by the clock (CL2) of stage 2 at time period *t4*. Consequently, reverse current ($I_{R2}$) is not produced in the recombination diode and an output signal is not produced at the output of stage 2.

The output of stage 2 is supplied as an input of stage 3 and inasmuch as that the input signal to stage 3 is a low level signal from *t1* to *t11*, forward current ($I_{F3}$) flows through the recombination diode with the exception of time period *t6* when a clock pulse is supplied by clock CL3. Therefore, reverse current ($I_{R3}$) flows through the recombination diode to switch the tunnel diode at time period *t6* thereby producing an output signal at this time period. Since the output signal at stage 3 (the input signal to stage 4) is a high level signal, no reverse current ($I_{R4}$) is produced during the application of the clock signals by clock CL4 at time period *t8* inasmuch as forward current ($I_{F4}$) was not previously produced through the recombination diode during the time period *t7* preceding the clock signal. Consequently, there are no output signals produced at the outputs of stage 4 and, therefore, no output signals are supplied to output device 728.

During the time periods *t9* to *t16*, the input (Input 1) to stage 1 is a high level signal. Consequently, forward current ($I_{F1}$) does not flow at all during this time in stage 1. Inasmuch as there is no forward current, no reverse current ($I_{R1}$) is produced during the application of clock pulses (CL1) during time period *t10*. Since reverse current ($I_{R1}$) is required to switch the tunnel diode, a low level output signal is produced by stage 1 whereby the input signal to stage 2 is a low level signal. As in the case of stage 1 during time periods *t1* through *t8*, the application of a low level input signal to stage 2 during time periods *t9* to *t17* permits forward current ($I_{F2}$) to flow through the recombination diode except in the time period *t12* which coincides with the clock signal. Thus, reverse current ($I_{R2}$) is produced through the recombination diode at time period *t12* and an output signal is produced at the output of stage 2 and, therefore, at the input of stage 3. This output signal is, of course, a high level signal whereby the requisite forward current ($I_{F3}$) is not produced in stage 3, immediately prior to the clock pulse at time period *t14*. Consequently, reverse current ($I_{R3}$) is not produced in stage 3 and output signals are not produced at the output thereof.

Since the output signal at stage 3 is a low level signal the input signal to stage 4 is also a low level signal whereby forward current ($I_{F4}$) may flow through the recombination diode such that the application of a clock pulse at stage 4 at time period *t16* will produce reverse current ($I_{R4}$) through the recombination diode such that the tunnel diode will switch and produce an output signal at the output of stage 4 which output signals are applied to output device 728 at time period *t16*. It will be seen from the timing diagram of FIGURE 8 that each stage provides signal inversion at the output thereof. In addition, the multiphase clock arrangement produces a shift in each stage.

The operation of the circuit during time periods *t*17 through *t*32 is similar to the operation previously discussed. However, the input signals are applied in a slightly different pattern in order to indicate that the input pattern previously described is not a critical input required by the circuit. Moreover, the high level input signal shown at time periods *t*21 and *t*25 is shown as a pulse type input as opposed to a level type input shown previously. That is, as previously discussed the dashed signal portions shown during time periods *t*11 and *t*12, and *t*15 and *t*16 are relatively immaterial to the operation of the circuit and may, in fact, be omitted whereupon the level input signal may effectively become a pulsating type input signal. This is one further modification in the system as shown which may be made in accordance with the preferred method of operation of the circuit. Other specific modifications have been described supra in relation to the specific circuit diagrams shown in FIGURES 3 and 5.

Figure 9:
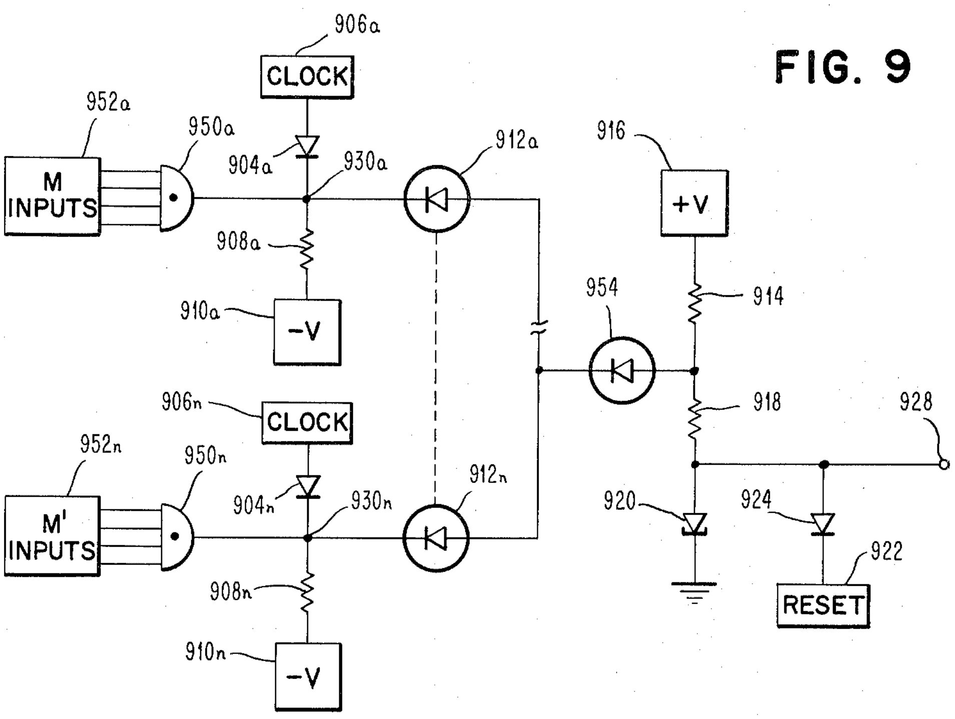
FIGURE 9 is a schematic drawing showing another embodiment of the invention.
Figure 10:
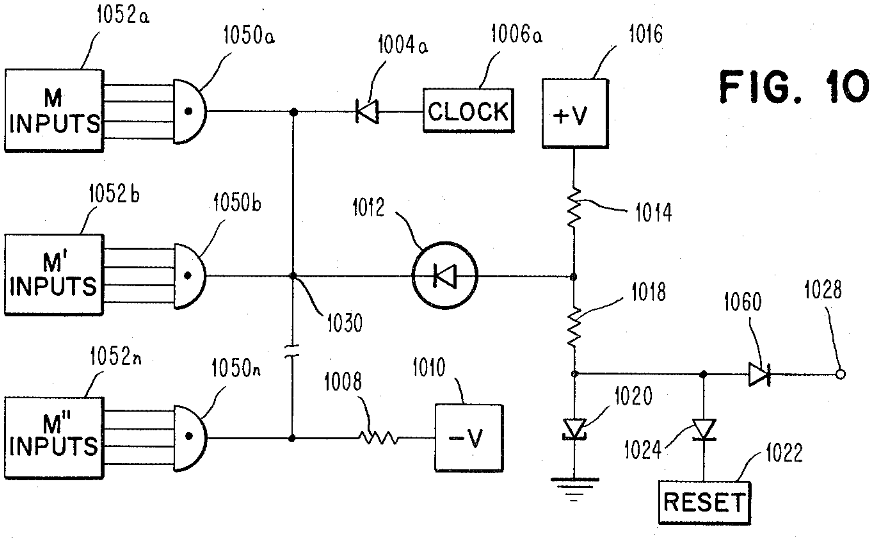
FIGURE 10 is a schematic drawing showing another embodiment of the invention.

Referring now to FIGURES 9 and 10, there are shown further embodiments of the instant invention. These embodiments relate particularly to circuits which would be utilized in logic systems. Moreover, as is well known in many logic systems, attempts are made to reduce the "levels of logic" between any particular stages of the system for many reasons including speed of operation, economy, etc. FIGURE 9 shows in particular a tunnel diode 920 having the cathode thereof connected to ground and the anode thereof connected to potential source 916 via resistors 914 and 918. These components are similar to components shown in other embodiments described in the application. As before, the anode of the tunnel diode 920 is connected to an output terminal 928 and to the anode of diode 924. The cathode of diode 924 is connected to a reset pulse source 922 of a conventional type. The input to the tunnel diode, to effect a switching thereof when so required, is applied at common junction 932 by the input and amplification stages via recombination diode 954. The input stages comprise gates 950*a* through 950*n*. Each of these gates are shown schematically as a logical AND gate. Gate 950*a* is supplied by M inputs from source 952*a* and gate 950*n* is supplied by M′ inputs from source 952*n* where M and M′ may or may not be equal. These gates are then connected to common junctions 930*a* and 930*n* respectively. The common junctions are each connected to a clock source, a recombination diode, and a negative potential source via a resistor, respectively. It will be seen that each of the N input and amplification stages coupled to common junction 932 via diode 954 is identical to the input and amplification stage shown in any of the preceding embodiments. This embodiment provides the advantage as noted supra that the number of "levels of logic" between two points in the circuit (e.g. input 952*a* and output 928) is reduced. That is, two or more amplification stages etc., are capable of driving, in parallel, a switching circuit rather than requiring a plurality of serially connected stages.

The operaton of the circuit is substantially identical to the operation described in connection with FIGURE 3. That is, tunnel diode 920 is normally biased to the low voltage condition by the application of a steady state current thereto on the order of 0.7 $I_P$. This biasing of the tunnel diode is effected by the current path between positive potential source 916 and ground via resistor 914, resistor 918 and tunnel diode 920. This steady state current ($I_B$, FIGURE 2) is defined when the recombination diodes 912*a* through 912*n* are reverse biased by the application of a high level signal to the cathodes thereof. When one or more of the input gates 950*a* through 950*n* produce low level signals at the cathode of the associated recombination diodes 912*a* through 912*n*, respectively, forward current ($I_F$, FIGURE 2) flows through recombination diode, for example diode 912*n* and the coupling resistor 908*n*, to negative potential source 910*n*. This current is defined by the recombination diode network and is a relatively small current in comparison to the peak current $I_P$ of the tunnel diode. Thus, as shown in FIGURE 2, the effective steady state current through tunnel diode 920 shifts down somewhat to the current defined by $I_{TD}$ where the difference between $I_B$ and $I_{TD}$ is a function of the forward current required by each recombination diode and the number of recombination diodes which are rendered conductive.

As in the case of the embodiment shown in FIGURE 3, when the input signals supplied to the circuit by each of the input gates 950*a* through 950*n* is a high level signal, the recombination diodes 912*a* through 912*n* are reverse biased and cannot pass the current pulse supplied by clocks 906*a* through 906*n*. On the other hand, however, when the input signal supplied by any of the input gates 950*a* through 950*n* is a low level signal, the recombination diode assocated therewith is forward biased and passes a forward current therethrough. This forward current is effective to store charge in the lattice structure of the recombination diode. The application of a clock signal is then effective to pass reverse current therethrough such that the tunnel diode 920 is switched from the low to the high voltage operating condition. The output signal supplied by the circuit is provided at output terminal 928 in accordance with the condition of the tunnel diode 920 as discussed supra. Thus, this circuit provides a single tunnel diode switching element which may be driven by any one of N logic stages via an input AND gate and a recombination diode which provides an interstage amplification network.

The recombination diode 954 is utilized as a type of isolation diode. That is, when any of the N stage recombination diodes, for example diode 912*a* is clocked while reverse biased, a small leakage current flows therethrough due to the shunt capacity of the diode. Individually, the leakage currents supplied by these diodes are insufficient to switch the tunnel diode to the high voltage state. However, if a large enough number of these diodes are clocked simultaneously and the leakage currents are all applied directly to the tunnel diode 920, the tunnel diode may be switched. Therefore, the diode 954 is suggested as a coupling device between the tunnel diode and the input stages. That is, regardless of the magnitude of the leakage current supplied to the cathode of diode 954, only the leakage current passed thereby is produced at the tunnel diode and this is insufficient to switch the tunnel diode. Any excess current over and above the leakage current passed by diode 954 will be dissipated through the other input circuits. It is understood that this leakage current is not sufficient to so forward bias the other input recombination diodes as to permit spurious reverse or recombination current therethrough during the application of the next clock pulse. It should be clear also that diode 954 may not be necessary if control of the leakage current may be provided, or, if the tunnel diode is insensitive to the leakage current supplied by a plurality of input circuits.

Referring now to FIGURE 10, there is shown another logic circuit which provides a single tunnel diode 1020 connected to a single recombination diode 1012 which acts as an interstage amplification coupling network between the tunnel diode and a plurality of input AND gates. Thus, the AND gates 1050*a* and 1050*b* through 1050*n* are each coupled to common point 1030 which is connected to the cathode of recombination diode 1012, the anode of which is connected to tunnel diode 1020 via resistor 1018. Again, the operation of this circuit is substantially similar to that shown in FIGURE 3 inasmuch as the tunnel diode is normally biased in the low voltage operating condition by the current produced by the potential source 1016 and resistors 1014 and 1018. The recombination diode 1012 is again effective to pass reverse current therethrough in response to a clock pulse applied thereto from clock source 1006*a* via diode 1004*a* only subsequent to the passage of forward current therethrough. The forward current flow through diode 1012 is possible only when all of the input gates 1050*a* and 1050*b* through 1050*n* produce low level signals. When reverse current is passed through recombination diode 1012, tunnel diode 1020 is switched to the high voltage operating condition and the high level output signal is produced at the anode of the tunnel diode. This high level signal may be passed to output device 1028 via diode 1060. The diode 1060 is utilized as an isolating stage between cascaded tunnel diode logic circuits. This diode may not be required in all cases but is essential in some circuit arrangements. Thus, if output device 1028 represents a plurality of output circuits, there is the possible problem of feedback from these circuits to the tunnel diode 1020. The diode 1060 effectively limits the so-called feedback current to the leakage current which flows through the one coupling diode and avoids a large leakage current from each of the output circuits.

It will be seen, that the circuit embodiment shown in FIGURE 9, in effect, provides an OR logic function at the input to the circuit, while the circuit embodiment shown in FIGURE 10 has an effective AND logic function at the input thereof. These embodiments are suggested to show particular logic system applications of the circuit. In addition, the circuits are meant to be illustrative of proposed applications of the system and are not meant to be limitative or restrictive thereof. Other logic functions may be suggested to those skilled in the art which functions may be used with the proposed circuit without varying significantly from the basic principles suggested. These suggested variations are meant to be included within the inventive concepts described.

Having thus described the invention what is claimed is:

1. In a signal switching network, a bistable tunnel diode switching element, a source of periodic current pulses, a charge storing semiconductor coupling said source to said tunnel diode, input terminals coupled to said semiconductor, means for selectively storing charge in said semiconductor only in response to a predetermined signal at said input terminal, and output means connected to said bistable switching element, said source adapted to produce a switching current pulse at said bistable switching element via said semiconductor only subsequent to the storage of charge in said semiconductor.

2. In combination, a tunnel diode circuit, means including a bias source connected to said tunnel diode to bias said tunnel diode circuit for operation in a bistable mode, means for supplying input signals having two distinct levels, charge storage diode means connected between said means for supplying input signals and said tunnel diode circuit, means cooperating with said bias source for passing forward current through said charge storage diode thereby to charge said storage diode only in response to the application thereto of an input signal of one level, and pulse supplying means connected to said charge storage diode means for supplying signals thereto to cause a reverse current pulse to flow through said storage diode to said tunnel diode circuit whenever said storage diode is charged, said reverse current pulse having sufficient magnitude to switch said tunnel diode circuit to a predetermined one of its two stable states.

3. The combination called for in claim 2 including impedance means between said charge storage diode means and said tunnel diode such that a potential difference exists therebetween.

4. In combination, a tunnel diode circuit having two stable operating states, bias means connected to said tunnel diode circuit for providing current thereto of a magnitude so as to cause said tunnel diode circuit to normally operate in one of said stable states, input means for supplying input signals having two distinct levels, charge storing means connecting said input means to said tunnel diode, said charge storing means comprising at least one charge storage diode, pulse supplying means connected to said charge storing means operative to reverse drive said storage diode, said charge storing means being operative to selectively store a charge therein in response to an input signal of one level such that pulses supplied by said pulse supplying means may be selectively applied to said tunnel diode circuit via said charge storing means only when a charge is stored in said charge storing means.

5. In combination, a tunnel diode having two distinct stable operating states, bias means connected to said tunnel diode for biasing said tunnel diode to one of said stable operating states, input means, said input means providing input signals having two distinct levels, current steering means connected between said tunnel diode and said input means, said current steering means including at least one charge storage diode, pulse supplying means connected to said current steering means for selectively providing pulses to said tunnel diode via said storage diode of said current steering means such that the operating state of said tunnel diode may be selectively changed, output means connected to said tunnel diode, and reset means connected to said tunnel diode.

6. The combination called for in claim 5 including a current sink connected to said current steering means such that pulses may be provided thereto when said current steering means does not selectively provide pulses to said tunnel diode.

7. In combination, a tunnel diode circuit, means including a bias source connected to said tunnel diode to bias said tunnel diode circuit for operation in a bistable mode, a plurality of input gate means for supplying input signals having two distinct levels, at least one charge storage diode means connected in series between said input gate means and said tunnel diode circuit, said charge storage diode means storing charge therein only in response to the application thereto of an input signal of one level, and at least one pulse supplying means connected to said charge storage diode means for supplying signals thereto to cause a reverse current pulse to flow through said storage diode to said tunnel diode circuit whenever said storage diode has charge stored therein, said current pulse having sufficient magnitude to switch said tunnel diode circuit to a predetermined one of its two stable states.

8. In combination, a tunnel diode circuit, means including a bias source connected to said tunnel diode to bias said tunnel diode circuit for operation in a bistable mode, means for supplying input signals having two distinct levels, charge storage circuit means connected in series between said means for supplying input signals and said tunnel diode circuit, said charge storage circuit means passing forward current therethrough thereby to charge said charge storage circuit only in response to the application thereto of an input signal of one level, and pulse supplying means connected to said charge storage circuit means for supplying signals thereto to cause a reverse current pulse to flow through said charge storage circuit means to said tunnel diode circuit whenever said charge storage circuit is charged, said reverse current pulse having sufficient magnitude to switch said tunnel diode circuit to a predetermined one of its two stable states.

9. A circuit comprising, a series circuit including a semiconductor diode capable of storing charge therein, a switching device, means for causing current of predetermined magnitude to flow through said semiconductor diode in the forward direction to inject charge therein, first circuit means coupled to said switching device for applying an input pulse thereto to selectively interrupt the flow of current through said diode, second circuit means for supplying pulses to said diode to cause current to flow therethrough in the reverse direction thereby to deplete the charge previously stored therein, and a tunnel diode coupled to said diode for receiving the reverse current generated therethrough whereby said tunnel diode may have the operating state thereof altered.

References Cited by the Examiner

UNITED STATES PATENTS

| | | | |
|---|---|---|---|
| 2,737,601 | 3/1956 | McMahon | 307—88.5 |
| 2,823,321 | 2/1958 | Sims | 307—88.5 |
| 3,040,186 | 6/1962 | Duzer | 307—88.5 |
| 3,071,700 | 1/1963 | Smith | 307—88.5 |
| 3,106,644 | 10/1963 | Retzinger | 307—88.5 |
| 3,182,204 | 5/1965 | Galletii | 307—88.5 |

OTHER REFERENCES

Pub. I, International Solid State Ckts. Conf. Digest of Tech. Papers, pages 10 and 11.

ARTHUR GAUSS, *Primary Examiner.*

B. P. DAVIS, *Assistant Examiner.*